United States Patent
Ling et al.

(10) Patent No.: US 6,189,463 B1
(45) Date of Patent: Feb. 20, 2001

(54) METHODS AND APPARATUS FOR INCINERATING COMBUSTIBLE WASTE MATERIAL SUCH AS FARM ANIMAL BIOMASS

(75) Inventors: Sung C. Ling; Hsien P. Pao, both of Silver Springs, MD (US)

(73) Assignee: General Technology, Inc., Silver Spring, MD (US)

( * ) Notice: Under 35 U.S.C. 154(b), the term of this patent shall be extended for 0 days.

(21) Appl. No.: 09/076,132

(22) Filed: May 12, 1998

(51) Int. Cl.[7] .............................. F23G 5/027; F23B 7/00
(52) U.S. Cl. ......................... 110/346; 110/110; 110/230; 110/257; 110/342
(58) Field of Search ..................... 110/341, 342, 110/344, 346, 101 R, 102, 110, 229, 230, 196, 255, 257, 233

(56) References Cited

U.S. PATENT DOCUMENTS

| 4,084,521 | * | 4/1978 | Herbold et al. | 110/342 X |
|---|---|---|---|---|
| 4,147,115 | * | 4/1979 | Leppert | 110/346 X |
| 4,210,491 | * | 7/1980 | Schulman | 110/230 X |
| 4,213,404 | * | 7/1980 | Spaulding | 110/229 |
| 4,230,451 | * | 10/1980 | Chambe | 110/255 X |
| 4,335,664 | * | 6/1982 | Lucas et al | 110/346 |
| 4,338,869 | * | 7/1982 | Hoskinson | 110/257 X |
| 4,361,100 | * | 11/1982 | Hinger | 110/110 X |
| 4,377,116 | * | 3/1983 | Satake | 110/229 X |
| 4,398,471 | * | 8/1983 | Thomanetz | 110/255 X |
| 4,470,358 | * | 9/1984 | Prochnow | 110/229 |
| 4,650,546 | * | 3/1987 | Le Jeune | 110/230 X |
| 4,672,899 | * | 6/1987 | Kainer | 110/229 X |
| 4,765,255 | * | 8/1988 | Chiarva | 110/229 X |
| 4,909,162 | * | 3/1990 | Vollhardt | 110/230 X |
| 4,989,523 | * | 2/1991 | Ling et al. | 110/341 |
| 5,010,831 | * | 4/1991 | Halfhide | 110/229 X |
| 5,411,714 | * | 5/1995 | Wu et al. | 110/110 X |
| 5,644,997 | * | 7/1997 | Martin et al. | 110/346 X |
| 5,653,183 | * | 8/1997 | Hansen et al. | 110/229 X |
| 5,720,232 | * | 2/1998 | Meador | 110/229 X |
| 5,724,900 | * | 3/1998 | Tratz | 110/229 X |
| 5,769,007 | * | 6/1998 | Tratz et al. | 110/229 X |
| 6,024,032 | * | 2/2000 | Sharpe | 110/342 |

FOREIGN PATENT DOCUMENTS

| 341788 | * | 10/1921 | (DE) | 110/229 |
|---|---|---|---|---|
| 31 26 419 A1 | * | 1/1983 | (DE) | 110/196 |
| 58-78011 | * | 5/1983 | (JP) | 110/196 |
| 5-286 | * | 1/1993 | (JP) | 110/229 |

OTHER PUBLICATIONS

Article: "Improving Combustion of Solid Fuels by Precarbonization", $3^{rd}$ International Symposium on Coal Combustion (S.C. Ling et al.; 1995).

* cited by examiner

Primary Examiner—Ira S. Lazarus
Assistant Examiner—Ljiljana V. Ciric
(74) Attorney, Agent, or Firm—Burns, Doane, Swecker & Mathis, LLP

(57) ABSTRACT

Farm animal biomass, such as the waste and shredded carcasses of poultry and hogs, and/or animal bedding, is incinerated by being delivered to the inlet of a duct. During a processing period the biomass is heated uniformly to a temperature while advanced through the duct by a feed screw without sufficient oxygen to support combustion. The temperature and processing time are sufficient for partially carbonizing the biomass into combustible gas and partially carbonized char. The char is discharged to a first combustion chamber to be combusted and converted to ash. The combustible gas is discharged to a second combustion chamber to be combusted within hot porous cylindrical ceramic combustors. A portion of the duct passes through the second combustion chamber in order to supply heat for partially carbonizing the biomass. Additional heat is provided by passing hot air through the feed screw. That hot air is discharged from the feed screw and supplied to the combustion chambers to support combustion therein.

13 Claims, 1 Drawing Sheet

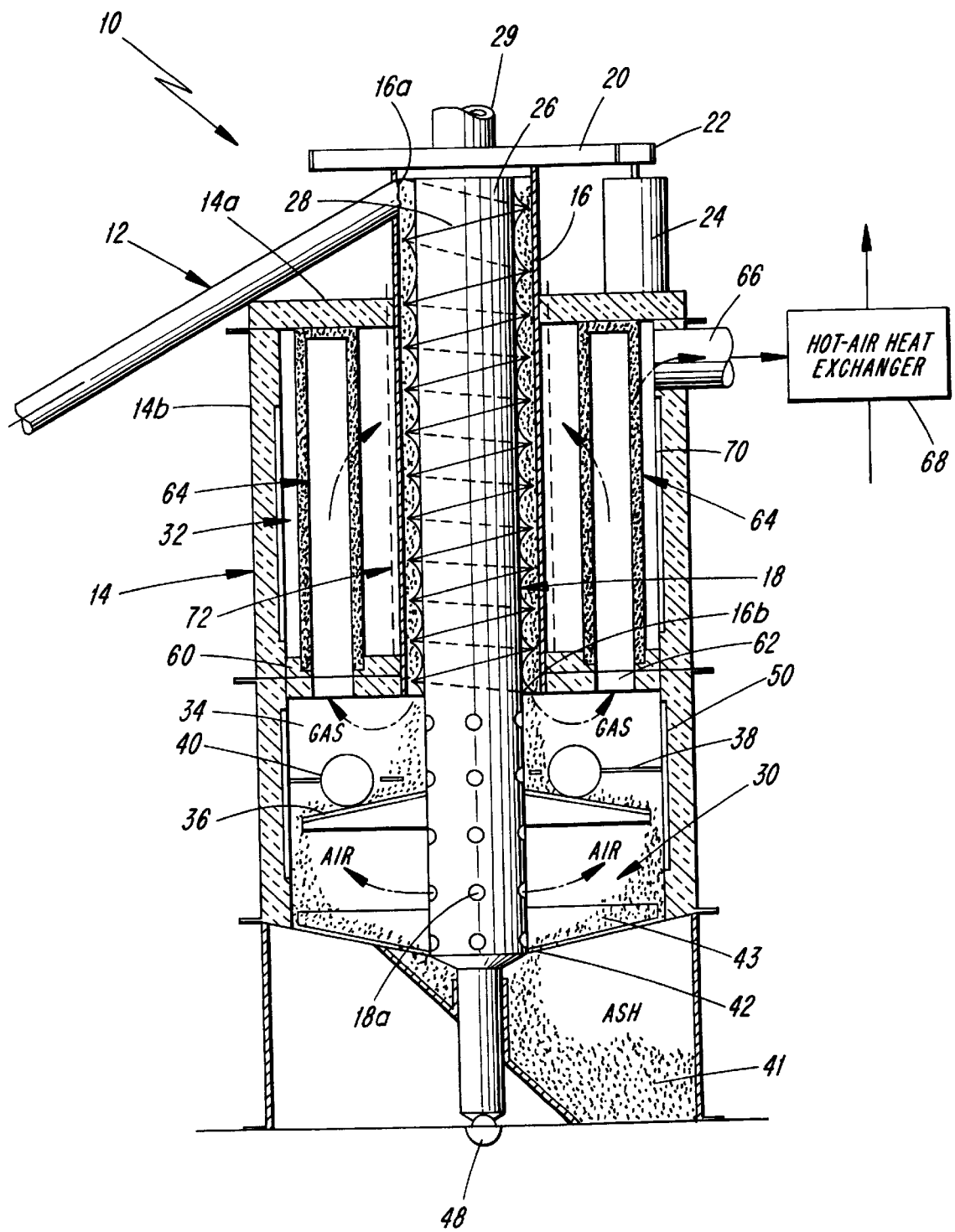

METHODS AND APPARATUS FOR INCINERATING COMBUSTIBLE WASTE MATERIAL SUCH AS FARM ANIMAL BIOMASS

BACKGROUND OF THE INVENTION

The present invention relates to methods and apparatus for the incineration of combustible waste material such as farm animal biomass in an essentially pollution free manner.

There exists a need for disposing of farm animal biomass from high-density animal farming without fouling the environment through excessive dispersion of nutrients and viruses. The term biomass as herein used includes, but is not necessarily limited to, the waste of farm animals (e.g. hogs and poultry), diseased animal carcasses, and animal bedding material (e.g., straw and wood chips). Currently, disposal methods include transferring such biomass to existing waterways, which can, however, pollute the water and present potential health hazards.

Proposals for incinerating the biomass have involved the use of high and non-uniform combustion temperatures, resulting in the production of noxious substances, such as $NO_x$, $SO_x$, CO, and sub-micron fly-ash which dictates the need for extensive (and expensive) scrubbing and filtering to meet current emission standards.

Other proposals, such as trucking, composting, and biodegrading have proven economically infeasible and detrimental to the environment and public health.

Therefore, it would be desirable to provide novel methods and apparatus for disposing of farm animal biomass in a relatively inexpensive, non-polluting manner.

SUMMARY OF THE INVENTION

The present invention relates to the method for the incineration of combustible waste material, such as farm animal biomass. The method comprises the steps of passing farm animal biomass through a duct in the absence of sufficient oxygen for supporting combustion, while heating the biomass to a temperature for transforming the biomass into combustible gas and partially carbonized char.

Preferably, the combustible gas and partially carbonized char are discharged from the duct to a combustion chamber arrangement in which the combustible gas and partially carbonized char are combusted in the presence of oxygen.

The biomass is preferably introduced into an inlet end of the duct and advanced therein by a rotating feed screw disposed coaxially within the duct.

Hot air is preferably conducted within the interior of the feed screw in order to heat the feed screw, and a portion of the duct is located in the combustion chamber arrangement, in order to heat the duct. By heating the feed screw and the duct, the biomass is heated to a carbonizing temperature.

The invention also pertains to an apparatus for the disposal of combustible waste material, such as farm animal biomass. The apparatus comprises a duct having an inlet for receiving farm animal biomass, and an outlet. A conveyor is disposed in the duct for advancing the biomass toward the outlet in the absence of sufficient oxygen for supporting combustion. A heating arrangement heats the advancing biomass to a temperature sufficient for transforming the biomass into partially carbonized char and releasing combustible gas therefrom. A combustion chamber arrangement receives the partially carbonized char and combustible gas from the outlet and combusts the partially carbonized char and the combustible gas.

The feed screw is preferably hollow and is supplied with heated air for heating the feed screw. That air is discharged from an air outlet of the feed screw and into the combustion chamber arrangement for supporting combustion. A portion of the duct extends through the combustion chamber arrangement for heating the duct.

Preferably disposed within the combustion chamber arrangement is a hollow cylindrical porous ceramic wall member arranged to conduct the combustible gas radially therethrough, whereby combustion occurs within the porous ceramic wall member.

BRIEF DESCRIPTION OF THE DRAWING

The objects and advantages of the invention will become apparent from the following detailed description of a preferred embodiment thereof in connection with the accompanying drawing in which like numerals designate like elements, and wherein the sole FIGURE depicts a vertical sectional view taken through an apparatus according to the present invention.

DETAILED DESCRIPTION OF A PREFERRED

Depicted in the figure is an incinerator 10 for incinerating farm animal biomass in an essentially pollution-free manner. The biomass, such as poultry waste, hog waste, shredded animal carcasses, and animal bedding material (e.g., straw, wood chips, plastics), for example, and combinations thereof, is conducted through a separator, not shown, to remove metal, stone, etc. and then is supplied to the incinerator.

The incinerator 10 includes a conveyor 12, such as a feed screw, for feeding the biomass to the top of a housing 14 of the incinerator, which includes a cylindrical body 14a and a cover 14b formed of insulation bricks, for example. Extending vertically through the housing 14 is a tubular duct 16 formed of any suitable material, such as stainless steel. The duct 16 has an inlet 16a at its upper end for receiving biomass, and an outlet 16b at its lower end. Disposed coaxially in the duct 16 is a driver for conveying biomass through the duct. The driver comprises a feed screw 18 which includes a hollow stud 26 and a helical thread 28 mounted on an outer periphery of the stud. An upper end of the screw 18 is fixed to a gear 20 which is driven by a pinion gear 22, the latter being driven by a motor 24.

It will be appreciated that an annular channel is formed between the stud 26 of the feed screw 18 and an inside surface of the duct 16, the channel being occupied by the helical thread 28 of the feed screw 18. The feed screw 18 is driven to feed the biomass at a very slow, controlled rate, with the helical passage defined by the screw thread being substantially filled with biomass, i.e. the helical passage contains very little air. As will be explained, the biomass, as it is being fed, is heated to a relatively low temperature which is insufficient to initiate combustion of the biomass (which would be difficult anyway, due to the small amounts of oxygen present in the helical passage), but which is high enough to transform the biomass into partially carbonized char wherein most, but not all, of the hydrocarbon compounds therein are carbonized. Since the biomass is carbonized slowly at a relatively low temperature, rather than being combusted at a high temperature, only minimal amounts of toxic gases, such as $NO_x$, $SO_x$, and CO are produced. It is known from the present inventors' U.S. Pat. No. 4,989,523 that low amounts of toxic gases are produced by the combustion of partially carbonized fuel such as a mixture of coal, clay, water and lime. The disclosures of U.S. Pat. No. 4,989,523 is incorporated herein by reference.

The heating of the biomass is achieved by heating the radially inner and outer sides of the annular channel, i.e. heating the feed screw 18 and the duct 16. Heating of the duct 16 is achieved by positioning a portion of the duct 16 within a combustion chamber, to be subsequently described. Heating of the feed screw is achieved by conducting a flow of heated air downwardly through a hollow interior of the feed screw. That heated air is introduced from a supply conduit 29, and exits the feed screw through holes 18a formed in a portion of the stud 26 of the feed screw disposed below the duct 16.

Upon exiting the duct 16 through the outlet 16b thereof, the partially carbonized char, and the combustible gas separated therefrom, travel to a combustion chamber arrangement preferably comprised of two separate lower and upper combustion chambers 30, 32. As will be explained, the partially carbonized char is combusted, in the presence of oxygen, in the lower combustion chamber 30, and the combustible gas is combusted, in the presence of oxygen, in the upper combustion chamber 32.

The lower combustion chamber 30 is spaced from the outlet 16b of the duct 16 by an intermediate chamber 34 which serves to conduct the partially carbonized char C and combustible gas G to the respective combustion chambers 30 and 32.

Disposed in the intermediate chamber 34 is a conical ramp 36 onto which the partially carbonized char from the outlet 16b gravitates. The ramp is fixed to the feed screw 18 so it rotates therewith. Overlying the ramp 36 is a horizontal plate 38 that is fixed to the housing 14. The plate 38 comprises a plurality of circumferentially spaced holes in which are disposed steel pulverizing balls 40 which rest on the ramp 36. As the ramp rotates with the feed screw 18, the balls 40 are caused to rotate and thus crush the precarbonized char which is sliding downwardly along the ramp.

After being pulverized, the partially carbonized char falls from an outer peripheral edge of the ramp and into the lower combustion chamber 30. Heated air is supplied to the lower combustion chamber 30 for supporting combustion. That air is the air which was used to heat the feed screw 18 and which has exited through the holes 18a located in the portion of the stud 26 of the feed screw 18 situated in the lower combustion chamber. The char is thus transformed into bottom-ash 41 which falls through an opening 42 formed in a floor of the lower combustion chamber 30, with the aid of scrapers 43 affixed to, and extending radially from, the stud 26. That bottom-ash is free of unburned carbon and is chemically neutral, so that it can be transported in any suitable manner to a storage container for subsequent mixing with soil. The opening 42 also accommodates a lower portion of the stud 26, enabling the lower end thereof to be rotatably supported on a thrust bearing 48.

Electric start-up heaters 50 and 70 are mounted in the lower and upper combustion chambers 30 and 32, respectively, for providing start-up heat to start the combustion operation.

The upper combustion chamber 32 includes a floor 60 having a plurality of holes 62 formed therein. Mounted on the floor are combustors in the form of hollow cylinders 64. The cylinders 64, which have their longitudinal axes aligned with respective holes 62, are formed of porous ceramic material, e.g. alumina. Combustible gas emerging from the outlet, i.e. small amounts of hydrocarbon and water vapor are mixed with heated air emerging from the feed screw 18 through the holes 18a located in the intermediate chamber 34. That gas/air mixture travels through the holes 62 formed in the floor 60 and into the cylinders 64, and passes radially outwardly through the cylinders. Combustion occurs within the heated ceramic walls of the cylinders 64. The surfaces of ceramic particles forming that wall could be coated with a microfilm of platinum to serve as a catalytic surface for the dissociation of toxic $NO_x$, CO and unburnt hydrocarbon gases into nontoxic $CO_2$, $N_2$, and $H_2O$ vapor. The heat generated by the combustion occurring in the cylinders 64 exits the upper combustion chamber 32 through an outlet conduit 66 and is conducted through a heat exchanger 68 and draft stack for transferring heat to fresh air passing in cross-flow relationship therewith. That heated fresh air can be employed to heat an animal dwelling and/or be conducted to the feed screw 18 via conduit 29, for example.

A portion of the duct 16 passing through the upper combustion chamber 32 is heated therein to provide some of the heat which converts the biomass into partially carbonized char. A schematically-depicted heat shield 72 could be arranged in the upper combustion chamber 32 in surrounding relationship to the duct 16, in order to control the amount of heat transferred to the duct.

In operation of one tested apparatus, farm animal biomass is delivered to the inlet of the duct 16, and is fed downwardly through the duct 16 by the feed screw 18, while being heated to a carbonizing temperature of about 370° C. That heating was effected by heated air of about 400° C. traveling through the feed screw 18, and heated air of about 800–900° C. produced in the upper combustion chamber 32. The magnitude of the carbonizing temperature is typically 370° C. and can vary, depending upon the nature of the biomass (e.g., water content) and the amount of residual oxygen present therein. The residence time of the biomass within the duct 16 is about 15 minutes.

Since the biomass occupies substantially all of the helical passage formed by the screw thread of the feed screw 18, little air (oxygen) is present in the biomass, so actual combustion or pyrolysis of the biomass is effectively resisted. Regardless, the temperature to which the biomass is heated is preferably held below the temperature of combustion to ensure that no combustion occurs within the duct. If air were completely excluded from the duct, e.g. by suitable seals, then higher temperatures could be employed.

The biomass is converted to combustible gas and partially carbonized char within the duct. Since the biomass has been heated to a relatively low temperature, rather than being burned at a high temperature, the combustible gas contains high vapor-pressure hydrocarbon gases (low molecular weight gases). The combustible gas, upon exiting the duct 16b, is mixed with hot air emerging from the holes 18a in the intermediate chamber 34. The air/gas mixture then travels through the holes 62 and then through the ceramic combustors 64 in which combustion occurs. The heat produced by the combustion serves to heat the outer surface of the duct 16 and also is passed in heat-exchange relationship with fresh air in the heat exchanger 68.

The temperature of combustion in the combustion chambers 30, 32 can be regulated in any suitable fashion, e.g. by regulating the temperature and/or flow rate of air conducted through the air supply conduit 29. To minimize production of toxic $NO_x$, $SO_x$, and CO gases, the temperature of combustion is regulated at 800° C. and no more than 1000° C.

The partially carbonized char emerging from the duct 16 is crushed by the balls 40 and gravitates to the lower combustion chamber 30 where all remaining carbon therein is combusted. The resulting bottom-ash, which is essentially carbon-free, is discharged from the apparatus at 41.

The apparatus can be made as a relatively compact structure for use in individual animal housing. For instance, the height of the housing 14 could be from 6–7 feet, and the outer diameter thereof could be from 3–4 feet.

It will be appreciated that the present invention enables farm animal biomass to be incinerated on site in an environmentally safe manner, whereby the proliferation of new strains of virus due to high density farming of, e.g., poultry and hog, is effectively resisted and confined within individual animal housing. Unrestrained spreading of virus is detrimental to the operation of an animal farm and to the public health in general.

Furthermore, waste heat produced by the incineration is effectively used to heat animal dwellings and/or support the incineration operation.

The combustion of partially carbonized biomass produces only minimal amounts of toxic $NO_x$, $SO_x$, CO and hydrocarbon gas, and no micro flyash to pollute the air.

The use of cylindrically shaped combustor cylinders 64 ensures a uniform combustion of gas. Any $NO_x$, and CO gases passing through the cylinders 64 are converted into non-toxic $N_2$ and $CO_2$ gases.

If desired, for larger scale operation, the partially carbonized char from the duct 16b could be mixed with other additives, such as clay, lime and water, and pressed into briquettes for subsequent use in home cooking and heating stoves or in large industrial heating and power generation plants.

The method and apparatus of the present invention is not limited to the treatment of farm animal biomass, but rather can also be used for the precarbonization, preferably in large scale, of other combustible waste material such as sewage sludge, used rubber tires, combustible garbage, and toxic industrial wastes, for example. The resulting combustible gas would be burned, but the resulting char could be collected and formed into briquettes as described above.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A method for the treatment of combustible waste material, comprising the steps of passing the waste material through a duct by a feed screw without sufficient oxygen for supporting complete combustion, while applying heat to an outside surface of the duct and passing heated air through a hollow interior of the feed screw, for heating the waste material in the duct to a temperature for transforming the waste material into combustible gas and partially carbonized char.

2. The method according to claim 1, wherein a portion of the duct is located in the combustion chamber arrangement, and further including the step of discharging the combustible gas and partially carbonized char from the duct to a combustion chamber arrangement in which the combustible gas and partially carbonized char are combusted with oxygen combined therewith following the discharging step, wherein the passing step comprises passing the waste material through the portion of the duct located in the combustion chamber arrangement, to heat an outer surface of the duct.

3. A method for the treatment of farm animal biomass, comprising the steps of:
   A) introducing the biomass into an inlet end of a duct having an outside surface;
   B) rotating a feed screw disposed coaxially within the duct without sufficient oxygen for supporting complete combustion to advance the biomass through the duct, the feed screw including a hollow interior;
   C) applying heat to the outside surface of the duct and passing heated air through the hollow interior of the feed screw for heating the biomass in the duct to a temperature transforming the biomass into a combustible gas and partially carbonized char;
   D) discharging the partially carbonized char to a first combustion chamber in which the partially carbonized char is combusted with oxygen and transformed into bottom-ash, and
   E) discharging the combustible gas to a second combustion chamber in which the combustible gas is combusted with oxygen.

4. The method according to claim 3, further including the step of discharging heated air from the hollow interior of the feed screw into the first combustion chamber.

5. The method according to claim 3 wherein step comprises passing the biomass through a portion of the duct located in one of the first and second combustion chambers for heating the outside surface of the duct.

6. The method according to claim 3 further comprising the step of removing gases from the first combustion chamber and passing the gases through a heat exchanger to recover heat from the gases.

7. A method for the treatment of farm animal biomass, comprising the steps of:
   A) advancing the biomass through a duct by rotating a feed screw disposed in the duct without sufficient oxygen for supporting complete combustion, the feed screw having a hollow interior;
   B) heating the biomass within the duct by passing heated air through a hollow interior of the feed screw, the biomass being heated to a temperature transforming the biomass into a combustible gas and partially carbonized char; and
   C) discharging the combustible gas and partially carbonized char from the duct to a combustion chamber arrangement in which the combustible gas and partially carbonized char are combusted with oxygen.

8. The method according to claim 7, wherein heated porous ceramic members are disposed in the combustion chamber arrangement, and further including the step of conducting the combustible gas through the heated porous ceramic members disposed in the combustion chamber arrangement.

9. The method according to claim 7, wherein a portion of the duct is located in the combustion chamber arrangement, and wherein the passing step comprises passing the biomass through the portion of the duct located in the combustion chamber arrangement, to heat an outer surface of the duct.

10. The method according to claim 7 further comprising the step of removing gases from the combustion chamber arrangement and passing the gases through a heat exchanger to recover heat from the gases.

11. A method for the treatment of farm animal biomass comprising the steps of:
   A) advancing the biomass through a duct;
   B) heating the biomass within the duct to a temperature transforming the biomass into a combustible gas and partially carbonized char; and
   C) discharging the combustible gas and partially carbonized char from the duct to a combustion chamber arrangement in which the combustible gas and partially carbonized char are combusted with oxygen, the combustion chamber arrangement containing heated porous ceramic members, wherein the combustible gas is conducted through the heated porous ceramic members.

12. The method according to claim 11 wherein each of the ceramic members includes a heated porous ceramic cylindrical wall, and wherein the conducting step comprises conducting the combustible gas through the heated porous ceramic cylindrical wall.

13. The method according to claim 11 further comprising the step of removing gases from the combustion chamber arrangement and passing the gases through a heat exchanger to recover heat from the gases.

* * * * *